C. RANDALL.
Cotton Planter.
Reissue No. 272.
Reissue July 25, 1854.
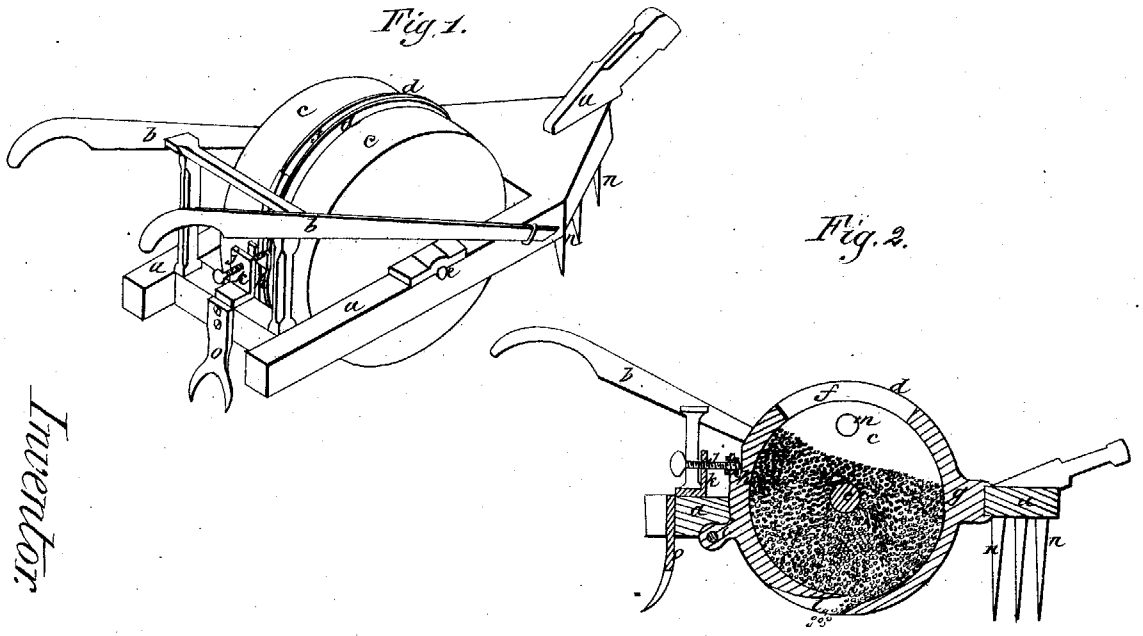
Witnesses.
S. H. Wales
J. W. Hamilton.
Inventor.
Charles Randall
N. PETERS. PHOTO-LITHOGRAPHER, WASHINGTON, D. C.

UNITED STATES PATENT OFFICE.

CHARLES RANDALL, OF PALMYRA, GEORGIA.

IMPROVEMENT IN SEED-PLANTERS.

Specification forming part of Letters Patent No. 9,370, dated November 2, 1852; Reissue No. 272, dated July 25, 1854.

*To all whom it may concern:*

Be it known that I, CHARLES RANDALL, of Palmyra, in the county of Lee and State of Georgia, have invented certain new and useful improvements in constructing seed-drills for dropping cotton and other seed; and I do hereby declare that the following is a full, clear, and exact description thereof, reference being had to the accompanying drawings and letters marked thereon, forming a part of this specification.

All contrivances heretofore known or used, as far as I am acquainted, for dropping cotton-seed have proved ineffectual, owing principally to the lightness and fuzzy surface of this description of seed, causing them, particularly in damp weather, to adhere, cake together, and obstruct the passage or aperture leading from the hopper, thus rendering the dropping irregular and uncertain.

My invention consists in a novel and peculiar arrangement of drill constructed with particular reference for adapting it to the dropping of cotton-seed.

The principal feature of novelty consists in making the seed-hopper cylindrical and capable of revolving, and with a central discharge-passage all round its perimeter, said hopper serving to carry the seed, and, in revolving, to thoroughly agitate and separate the same and sow it in a straight line in the center of the furrow in a very regular and perfect manner.

The next feature of novelty consists in so constructing the carrying-wheel that it shall perform the several functions of serving as a hopper for holding, agitating, and sowing the seed, a plow to open the furrow, and a support for the implement, thus reducing the machine to great simplicity, compactness, and also durability.

In the accompanying drawings, Figure 1 represents an isometrical view of one of my improved drills or planters. Fig. 2 is a longitudinal vertical section through the center of the same.

Similar letters of reference refer to like parts in each of the two figures.

*a a* is the plow beam or frame, to which the horse or other animal employed to propel it is attached, provided with helves or handles *b b*, and resembling so far an ordinary drill.

The hopper, plow, and main wheel consist of two hollow disks, *c c*, of about eighteen inches in diameter, six inches broad, (more or less), with projecting flanges *d d* about one and one-half inch broad, which serve as plows to open the furrow and to conduct the seed into the bottom of the furrow in a straight line. These disks are firmly and permanently secured to and rotate with the shaft *e*, not close together, but so as to have a space or opening, *f*, about three-eighths of an inch wide (more or less) between the flanges. Secured to the front part of the beam in any well-known manner is a segment-plate, *g*, which fits the opening or space *f* between the flanges, and it extends down under the beam to about a perpendicular line drawn from the tread and across the axis of the disks, and it also projects above the beam sufficiently high to prevent the seed from escaping and to allow the disk with the shaft to be removed, and also to prevent the dirt from collecting and clogging the opening or space *f* between the flanges. This plate filling the space up flush with the periphery of the wheel makes a smooth bottom to the furrow, so that the seed will fall in a straight line and in the center and bottom of the furrow. Opposite to this and on the rear end of the beam is another segment-plate, *h*, which may be called a "tongue" or "seed-regulator," fitting the opening *f* in the same manner as *g*; but instead of being secured to the beam it is jointed thereto at *i*, and is provided with an adjustable screw, *j*, working loosely in the end of it, but through a thread in the bracket *k*, so that by turning said screw the tongue can be elevated or depressed at its lower end, *l*, which has the effect of increasing or diminishing the aperture or opening through which the seed are discharged, and thus regulating the discharge as desired.

The disks, as before stated, are hollow, and contain the seed, which is introduced through a hole, *m*, which is closed by a suitable cover. As the disks rotate the seed keep to the bottom and fall through the opening or discharge-aperture between the segment-plates. The constant rotary motion of the seed will prevent them from adhering or caking, thus producing a regular and sure discharge.

In the front end of the plow-beam is provided a series of teeth, *n*, to harrow the ground previous to laying open the furrow, and secured to the after part is a fork or board, *o*, for covering in the furrow over the seed.

What I claim as my invention, and desire to secure by Letters Patent, is—

The revolving cylindrical hopper composed of two hollow buckets or disks, *c c*, arranged a suitable distance apart to form a central discharge-passage on a horizontal revolving shaft for the purpose of holding and agitating the seed and discharging it in the center of the furrow in a straight line, substantially as and for the purpose herein described.

CHARLES RANDALL.

Witnesses:
S. H. WALES,
J. W. HAMILTON.